United States Patent
Matsusaka et al.

(10) Patent No.: US 7,075,394 B2
(45) Date of Patent: Jul. 11, 2006

(54) ELECTROMAGNETIC DRIVE FLOW CONTROLLER

(75) Inventors: Noboru Matsusaka, Kariya (JP); Hiroshi Sumiya, Hekinan (JP); Hiroshi Kawaguchi, Kariya (JP); Kenichi Oishi, Obu (JP)

(73) Assignee: Denso Corporation (JP)

( * ) Notice: Subject to any disclaimer, the term of this patent is extended or adjusted under 35 U.S.C. 154(b) by 167 days.

(21) Appl. No.: 10/695,353

(22) Filed: Oct. 29, 2003

(65) Prior Publication Data

US 2004/0085169 A1   May 6, 2004

(30) Foreign Application Priority Data

Oct. 31, 2002   (JP)   ............... 2002-318665

(51) Int. Cl.
   *H01H 51/22*   (2006.01)
   *H01F 7/08*   (2006.01)
(52) U.S. Cl. ......................... 335/80; 335/261
(58) Field of Classification Search ................ 335/261, 335/22–230; 251/129.15
   See application file for complete search history.

(56) References Cited

U.S. PATENT DOCUMENTS

| 4,149,132 | A  | * | 4/1979  | Richter et al. ............... 335/262 |
| 6,206,343 | B1 | * | 3/2001  | Kato et al. ............. 251/129.15 |
| 6,501,359 | B1 | * | 12/2002 | Matsusaka et al. ......... 335/278 |
| 6,664,685 | B1 | * | 12/2003 | Ameen et al. ................. 310/90 |
| 6,864,771 | B1 | * | 3/2005  | Komiyama et al. ......... 335/220 |
| 2002/0101314 | A1 |   | 8/2002  | Oishi et al. |
| 2002/0175569 | A1 |   | 11/2002 | Komiyama |
| 2003/0075702 | A1 | * | 4/2003  | Isobe et al. ............ 251/129.15 |

FOREIGN PATENT DOCUMENTS

| JP | 57109310 A | * | 7/1982 |
| JP | 2-158316   |   | 6/1990 |
| JP | 3-274162   |   | 12/1991 |
| JP | 8-284882   |   | 10/1996 |
| JP | 11-98798   |   | 4/1999 |
| JP | 11-304607  |   | 11/1999 |
| JP | 2002340216 |   | 11/2002 |

* cited by examiner

*Primary Examiner*—Elvin Enad
*Assistant Examiner*—Bernard Rojas
(74) *Attorney, Agent, or Firm*—Nixon & Vanderhye PC

(57) ABSTRACT

An electromagnetic drive has a sliding portion and a stator, the stator forming a magnetic circuit in combination with the sliding portion. The stator has an accommodating portion for supporting the sliding portion so the sliding portion can reciprocate inside the accommodating portion. A magnetic attractive force is generated by a coil to attract the sliding portion in one of the reciprocating directions. The coil generates a magnetic attractive force when energized such that either one or both of at least an outer peripheral wall of the sliding portion and at least an inner peripheral wall of said accommodating portion forms a magnetic portion made of nickel phosphide. The phosphorus content of said magnetic portion is set within a range of 5% to 15% in mass percentage.

11 Claims, 2 Drawing Sheets

ELECTROMAGNETIC DRIVE FLOW CONTROLLER

CROSS REFERENCE TO RELATED APPLICATION

This application is based upon, claims the benefit of priority of, and incorporates by reference, the contents of Japanese Patent Application No. 2002-318665 filed Oct. 31, 2002.

BACKGROUND OF THE INVENTION

1. Field of the Invention

The present invention relates to an electromagnetic drive and a flow controller using the same.

2. Description of the Related Art

Generally, electromagnetic drives are known in which a mover and a stator form a magnetic circuit, and the mover is driven to reciprocate. A kind of these electromagnetic drives is one in which the mover is supported directly by the inner periphery of an accommodating portion of the stator. The mover is attracted in one of its reciprocating directions by a magnetic attractive force that acts between an attracting portion of the stator and the mover (for example, see Japanese Patent Laid-Open Publication No. 2002-222710, hereinafter, patent document 1).

In the electromagnetic drive disclosed in the foregoing patent document 1, the outer periphery of them over is plated with nickel phosphide to achieve higher hardness levels, which reduces the sliding resistance that occurs between the mover and the accommodating portion. Nevertheless, the mover and the accommodating portion undergo a radial magneto motive force between them, which is called a side force. This side force brings the mover and the accommodating portion into tight contact and hampers sufficient reduction of the sliding resistance. Since the side force increases in proportion to the current supplied to the coil, the reciprocating position of the mover under the sliding resistance ascribable to the side force is not proportional to the current supplied to the coil, and thus the position is difficult to control.

SUMMARY OF THE INVENTION

It is an object of the present invention to provide an electromagnetic drive that reduces the sliding resistance that occurs between the mover and the accommodating portion that supports the mover, and a flow controller that uses the electromagnetic drive.

Another object of the present invention is to provide an electromagnetic drive that improves the controllability of the reciprocating position of the mover. Still yet another object of the present invention is to provide a flow controller that improves the controllability of fluid flow rate or fluid pressure.

According to an electromagnetic drive of a first aspect of the present invention, either one or both of an outer peripheral wall of a mover and an inner peripheral wall of an accommodating portion by which a stator supports the mover inside, forms a magnetic portion made of nickel phosphide. This magnetic portion has a relatively high hardness, and thus reduces the sliding resistance between the mover and the accommodating portion. In addition, according to the electromagnetic drive of the first aspect, the phosphorus content of the magnetic portion is set at or above 5% in mass percentage. This prevents the magnetic portion from becoming excessively high in the intensity of magnetization. Consequently, a rise in the side force acting radially between the mover and the accommodating portion can be suppressed for a further reduction in the sliding resistance between the mover and the accommodating portion. Since the sliding resistance between the mover and the accommodating portion can thus be sufficiently reduced, it is possible to improve the controllability of the reciprocating position of the mover.

As the phosphorus content of the magnetic portion increases, the intensity of magnetization of the magnetic portion decreases and the magnetic attractive force acting between the attracting portion of the stator and the mover drops. According to the electromagnetic drive of the first aspect, the phosphorus content of the magnetic portion is set at or below 15% in mass percentage. It is therefore possible to avoid a control failure in which the attracting portion cannot attract the mover due to an excessive drop of the magnetic attractive force.

According to an electromagnetic drive of a second aspect of the present invention, heat treatment is applied to the magnetic portion having a phosphorus content in the range of 5% and 15% in mass percentage. As compared to the case without the heat treatment, the magnetic attractive force acting between the mover and the attracting portion increases. This enhances the effect of preventing the electromagnetic drive from experiencing an operation failure.

A flow controller of a third aspect of the present invention has the electromagnetic drive according to the first or second aspect of the invention. Improved controllability of the reciprocating position of a moving member that reciprocates together with the mover is achieved by extension of the flow rate and pressure of fluid that flows through fluid paths due to the reciprocation of the moving member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of preferred embodiments with reference to the drawings is merely exemplary in nature and is in no way intended to limit the invention, its application, or uses.

Figure 2:
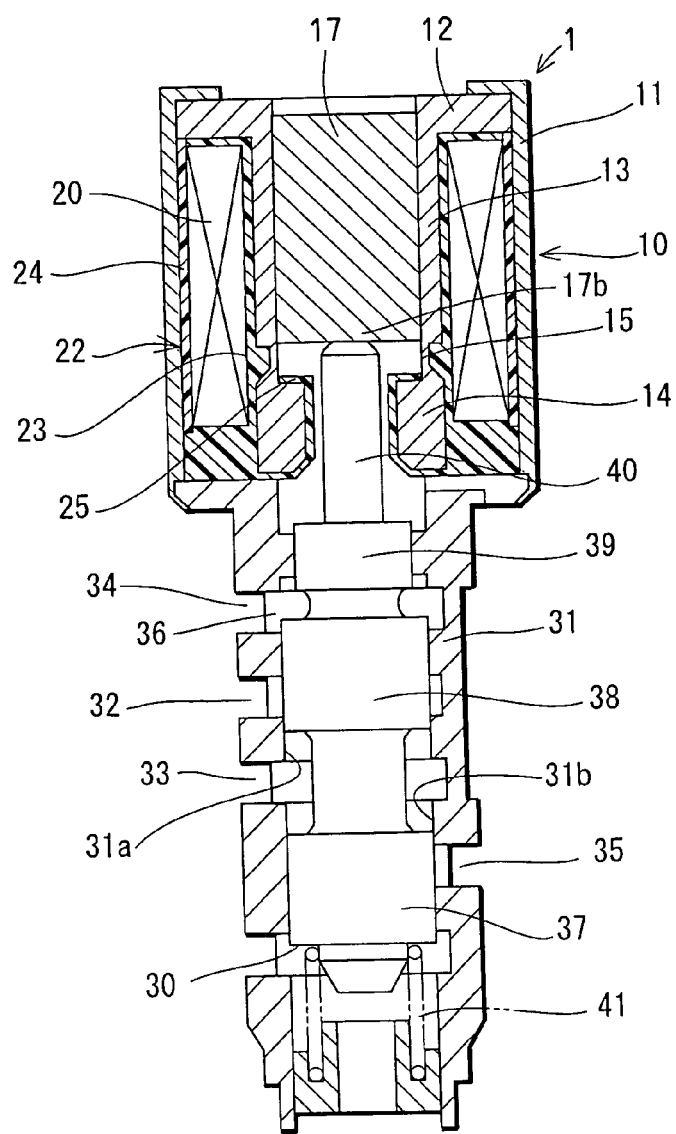
FIG. 2 is a cross-sectional view of the flow controller according to the embodiment of the present invention.

FIG. 2 shows a flow controller according to an embodiment of the present invention. The flow controller 1 is, for example, a spool type hydraulic pressure control valve for controlling the pressure of hydraulic oil supplied to the hydraulic control unit of an automotive automatic transmission.

The electromagnetic drive, or linear solenoid 10, includes a yoke 11, a stator core 12, a plunger 17, and a coil 20. The yoke 11, the stator core 12, and the plunger 17 are made of magnetic material. The plunger 17 constitutes a mover, and the yoke 11 and the stator core 12 constitute a stator.

The stator core 12 is formed in a cylindrical shape, and has an accommodating portion 13, an attracting portion 14, and a magnetic resistance portion 15.

The column-shaped plunger 17 is coaxially supported inside the accommodating portion 13. As shown enlarged in FIG. 1, the inner peripheral wall of the accommodating portion 13 is provided with a soft nitrided layer 50, and the outer peripheral wall of the plunger 17 an NiP layer 60. The soft nitrided layer 50 and the NiP layer 60 have a small clearance between them in the radial direction of the accommodating portion 13 and the plunger 17. Consequently, the plunger 17 may axially reciprocate, with its NiP layer 60 sliding over the soft nitrided layer 50 of the accommodating portion 13.

The attracting portion 14 is arranged on one of the axial ends of the accommodating portion 13. The attracting portion 14 generates, between itself and the plunger 17, a magnetic attractive force for attracting the plunger 17 in one of the axial directions or reciprocating directions.

Arranged between the accommodating portion 13 and the attracting portion 14 is the magnetic resistance portion 15 which is thinner than the portions 13, 14. The magnetic resistance portion 15 suppresses flux leakage between the accommodating portion 13 and the attracting portion 14.

The yoke 11 is formed in a cylindrical shape, and accommodates the stator core 12, the coil 20, and a resin molded member 22. Additionally, the yoke 11 is sealed with an end of a housing 31, whereby the stator core 12, the coil 20, and the resin molded member 22 are fixed between the yoke 11 and the housing 31.

The resin molded member 22 has a bobbin 23, a fixing portion 24, and a stopper 25. The bobbin 23 is formed in a cylindrical shape, and is fixed around the portions 13, 14, and 15 of the stator core 12. The coil 20 is wound around the bobbin 23. The fixing portion 24 is fixed around the coil 20, and covers the coil 20 in combination with the bobbin 23. The fixing portion 24 is further provided with connectors (not shown) for supplying electric power to the coil 20. The stopper 25 is formed integrally with the bobbin 23 by resin molding, and covers the surface of the attracting portion 14. The stopper 25 prevents the plunger 17 and the attracting portion 14 from making direct contact with each other.

When current is supplied to the coil 20 from terminals (not shown) electrically connected to the coil 20, flux flows through the magnetic circuit that consists of the yoke 11, the stator core 12, and the plunger 17. As a result, a magnetic attractive force acts between the attracting portion 14 of the stator core 12 and the plunger 17. The plunger 17 then reciprocates from the accommodating portion 13 toward the attracting portion 14, i.e., downward in FIG. 2. This movement of the plunger 17 is restricted by the plunger 17 coming into contact with the stopper 25.

The housing 31 accommodates and supports the spool 30, or moving member, so as to be capable of axial reciprocation. An input port 32, an output port 33, a feedback port 34, and a discharge port 35 are formed through the cylindrical peripheral wall of the housing 31 as respective fluid paths. Hydraulic oil supplied from a tank (not shown) flows into the input port 32. The output port 33 supplies the hydraulic oil to the engagement device of an automatic transmission (not shown). The output port 33 and the feedback port 34 communicate with each other outside the flow controller 1, so that some of the hydraulic oil flowing out of the output port 33 is introduced to the feedback port 34. A feedback chamber 36 is in communication with the feedback port 34. The discharge port 35 discharges the hydraulic oil to the foregoing tank.

The spool 30 is provided with a large diameter land 37, a large diameter land 38, and a small diameter land 39 which are arranged axially in this order from the end farthest from the linear solenoid. The small diameter land 39 is smaller than the large diameter lands 37, 38 with respect to its outer diameter. The spool 30 is brought into contact with an end 17b of the plunger 17 closer to the attracting portion 14 by means of a shaft 40 that is arranged on one of its axial ends. A spring 41, or biasing means, is arranged on the side of the spool 30 farther from the plunger. The spring 41 biases the spool 30 in a direction opposite to the direction that the plunger 17 is attracted by the attracting portion 14. That is, with respect to FIG. 2, the spool is biased upward by the spring 41. Since the spool 30 is pressed against the plunger 17 by the biasing of the spring 41, the spool 30 reciprocates together with the plunger 17.

The feedback chamber 36 is formed between the large diameter land 38 and the small diameter land 39. Because of the difference in outer diameter between the lands 38 and 39, the hydraulic pressure in the feedback chamber 36 functions to press the spool 30 to the end farther from the plunger. The aim of the partial feeding back of the hydraulic pressure output from the flow controller 1 is to prevent the output pressure from fluctuating due to variations of the hydraulic pressure supplied, i.e., the input pressure. The spool 30 comes to rest at a position where the force it undergoes from the hydraulic pressure in the feedback chamber 36, the force it is pressed with by the plunger 17, which is attracted by the attracting portion 14, and the biasing force it receives from the spring 41 are in balance.

The amount of hydraulic oil flowing from the input port 32 to the output port 33 is determined by seal length, or the length of the overlap between an inner peripheral wall 31a of the housing 31 and the outer peripheral wall of the large diameter land 38. The amount of hydraulic oil flowing from the input port 32 to the output port 33 increases with decreasing seal length. The amount of hydraulic oil flowing from the input port 32 to the output port 33 decreases with increasing seal length. Similarly, the amount of hydraulic oil flowing from the output port 33 to the discharge port 35 is determined by the seal length between an inner peripheral wall 31b of the housing 31 and the outer peripheral wall of the large diameter land 37.

When the spool 30 moves toward the spring 41, i.e., downward in FIG. 2, the seal length between the inner peripheral wall 31a and the large diameter land 38 increases and the seal length between the inner peripheral wall 31b and the large diameter land 37 decreases. Thus, the amount of hydraulic oil flowing from the input port 32 to the output port 33 decreases and the amount of hydraulic oil flowing from the output port 33 to the discharge port 35 increases. As a result, the hydraulic oil flowing out of the output port 33 falls in pressure. In contrast, when the spool 30 moves toward the plunger 17, the seal length between the inner peripheral wall 31a and the large diameter land 38 decreases and the seal length between the inner peripheral wall 31b and the large diameter land 37 increases. Thus, the amount of hydraulic oil flowing from the input port 32 to the output port 33 increases and the amount of hydraulic oil flowing from the output port 33 to the discharge port 35 decreases. As a result, the hydraulic oil flowing out of the output port 33 rises in pressure.

In such a flow controller 1, the current energizing the coil 20 is controlled to adjust the force that the plunger 17 utilizes to press the spool 30 away from the linear solenoid, whereby the hydraulic oil flowing out of the output port 33 is controlled in pressure. More specifically, when the energizing current of the coil 20 is increased, the magnetic attractive force with which the attracting portion 14 attracts the plunger 17 increases in proportion to the current value. This increases the force with which the plunger 17 presses the spool 30. The spool 30 stops when the force that results from the magnetic attractive force acting on the spool 30 from the plunger 17, the biasing force of the spring 41, and the force with which the spool 30 is pressed by the hydraulic pressure of the feedback chamber 36 come into balance. Consequently, an increase in the energizing current of the coil 20 lowers the pressure of the hydraulic oil that flows out of the output port 33.

Figure 1:
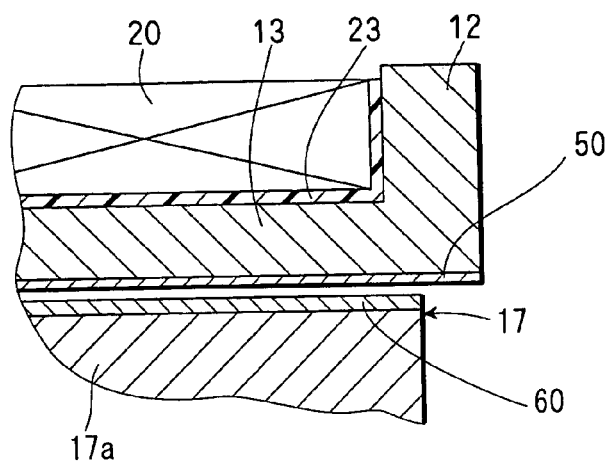
FIG. 1 is an enlarged cross-sectional view of essential portions of a flow controller according to an embodiment of the present invention.
Figure 3:
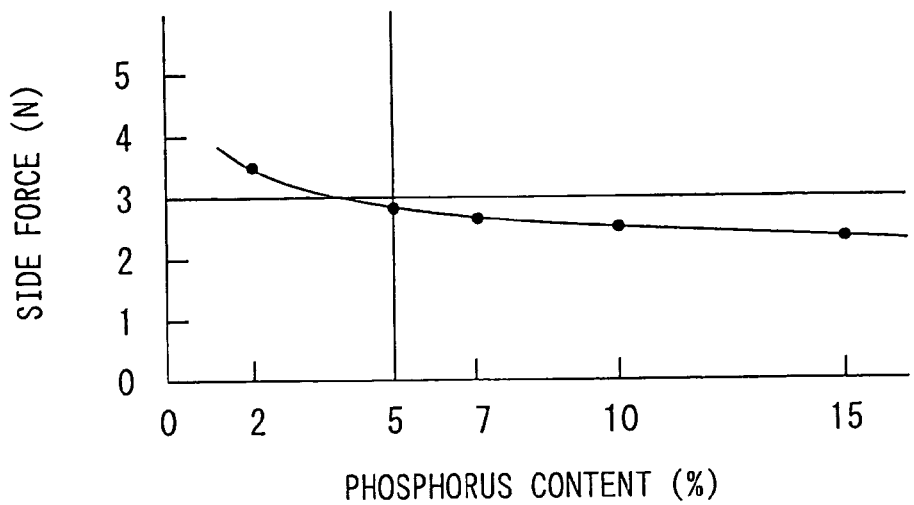
FIG. 3 is a graph showing the relationship between phosphorus content and side force of the embodiment of the present invention.
Figure 4:
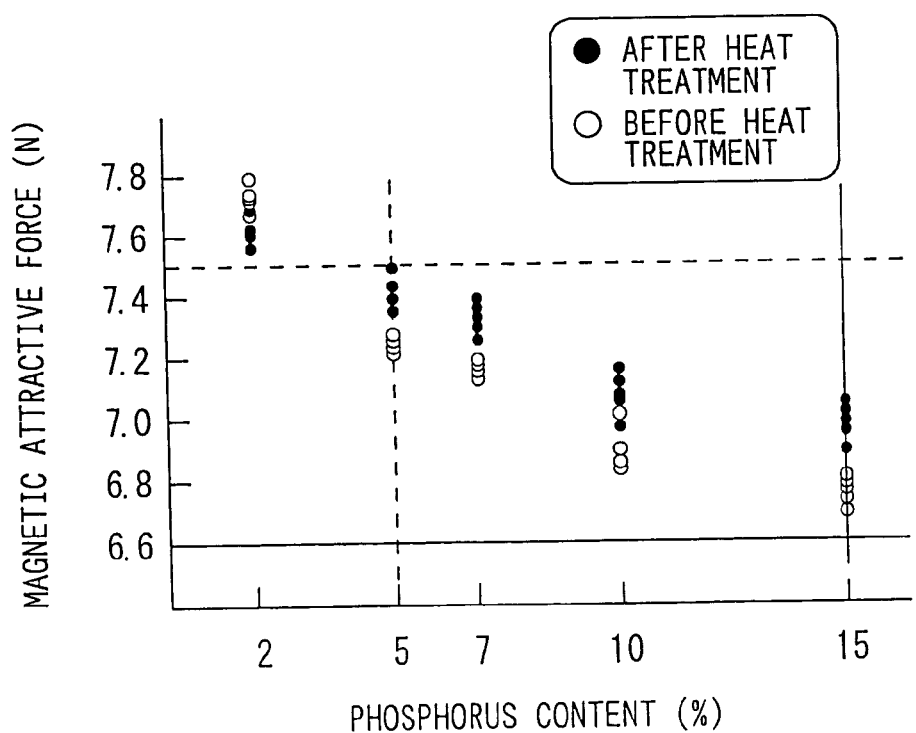
FIG. 4 is a graph showing the relationship between phosphorus content and magnetic attractive force of the embodiment of the present invention.

Next, the soft nitrided layer 50 and the NiP layer 60 will be described in more detail with reference to FIGS. 1, 3 and 4. The soft nitrided layer 50 is formed by applying gas soft nitriding to the inner periphery of the accommodating portion 13, which is made of a magnetic material such as iron. The soft nitrided layer 50 is given a surface hardness of Vickers Hardness (HV) 600 or so, for example.

The NiP layer 60, a magnetic portion, is formed by applying nickel phosphide (NiP) plating to the outer periphery of a body 17a of the plunger 17 which is made of magnetic material such as iron. The NiP layer 60 is given a surface hardness as high as HV 900 or so, for example. The phosphorus content of this NiP layer 60 is set within the range of 5% to 15% in mass percentage.

If the phosphorus content of the NiP layer 60 falls below 5%, the NiP layer 60 becomes excessively high in its intensity of magnetization. Here, when the coil 20 is supplied with its maximum current of 1 A, the side force acting between the soft nitrided layer 50 and the NiP layer 60 in the radial direction of the accommodating portion 13 and the plunger 17 can exceed 3 N as shown in FIG. 3. At side forces of above 3 N, too high a sliding resistance occurs between the soft nitrided layer 50 and the NiP layer 60 at the time of reciprocation of the plunger 17. The NiP layer 60 is thus given a phosphorus content of 5% or higher to suppress the side force to or below 3 N, whereby the sliding resistance between the soft nitrided layer 50 and the NiP layer 60 is reduced.

If the phosphorus content of the NiP layer 60 exceeds 15%, the NiP layer 60 becomes excessively low in its intensity of magnetization. Here, when the coil 20 is supplied with its maximum current of 1 A, the magnetic attractive force acting between the plunger 17 and the attracting portion 14 can fall below 6.6 N. At magnetic attractive forces below 6.6 N, it becomes impossible for the attracting portion 14 to attract the plunger 17. Consequently, the NiP layer 60 is given a phosphorus content of 15% or lower to ensure the magnetic attractive force of 6.6 N or above as shown by the hollow circles in FIG. 4. The plunger 17 can thus be reliably attracted to the attracting portion 14.

In the present embodiment, the NiP layer 60 formed by the plating may be further subjected to heat treatment. When the NiP layer 60 is heat treated, the magnetic attractive force acting between the plunger 17 and the attracting portion 14 can be increased as shown by the solid circles in FIG. 4, to enhance the effect of preventing the plunger 17 from an attraction failure. The preferred temperature at the time of heat treatment falls within the range of 300–400° C. For example, the temperature is set at 350° C. Incidentally, if heat treatment is applied to the NiP layer 60 that is given a phosphorus content of 5% or higher in consideration of a side force, the magnetic attractive force acting between the plunger 17 and the attracting portion 14 is 7.5 N or lower as shown by the solid circles in FIG. 4 when the coil 20 is supplied with its maximum current of 1 A.

According to the flow controller 1 described above, the NiP layer 60 of relatively high hardness, arranged on the outer peripheral wall of the plunger 17, is given a phosphorus content of 5% or higher. This reduces the sliding resistance that occurs between the NiP layer 60 and the soft nitrided layer 50 of the accommodating portion 13. The side force acting between the layers 50, 60 increases in proportion to the current supplied to the coil 20, whereas the plunger 17 of reduced sliding resistance can bring the relationship between the reciprocating position and the current supplied to the coil 20 to some proportional level. Consequently, the reciprocating positions of the plunger 17 and the spool 30 become easier to control. This also allows an improvement to the controllability of the pressure of the hydraulic oil flowing out of the output port 33. Besides, according to the flow controller 1, sufficient magnetic attractive force can be secured between the plunger 17 and the attracting portion 14. It is therefore possible to avoid a control failure of the reciprocation positions of the plunger 17 and the spool 30.

Incidentally, in the foregoing embodiment, the magnetic portion (NiP layer 60) made of nickel phosphide is constituted by the outer peripheral wall of the plunger 17, or mover, alone. Such a magnetic portion may also be constituted by any area of the mover as long as the outer peripheral wall is included. For example, the entire mover may form the magnetic portion. Otherwise, the magnetic portion may be constituted by an area of the stator including at least the inner peripheral wall of the accommodating portion 13. The magnetic portion may also be constituted by both an area including at least the outer peripheral wall of the mover and an area including at least the inner peripheral wall of the accommodating portion. Moreover, the magnetic portion may be formed by methods other than the plating as is the case with the NiP layer 60 of the foregoing embodiment. For example, in such cases that the magnetic portion is constituted by the entire mover and/or accommodating portion, it is possible to form the magnetic portion through post-treatment on nickel-phosphide material.

Furthermore, in the foregoing embodiment, the electromagnetic drive of the present invention is applied to the electromagnetic driving part of a flow controller. Nevertheless, the present invention may also be applied to the electromagnetic driving parts of mechanical devices other than flow controllers.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus comprising:
   a plunger;
   a stator that forms a magnetic circuit in combination with
      the plunger, the stator further defining:

an accommodating portion for supporting the plunger with the accommodating portion so that the plunger is capable of reciprocation; and an attracting portion, wherein a magnetic attractive force attracts the plunger in a reciprocating direction of the plunger and acts between the attracting portion and the plunger; and a coil that generates the magnetic attractive force when energized, wherein either one or both of at least an outer peripheral wall of the plunger and at least an inner peripheral wall of the accommodating portion form(s) a magnetic portion made of nickel phosphide, and the phosphorus content of the magnetic portion is set within a range of greater than 10% to less than or equal to 15% in mass percentage.

2. The apparatus according to claim 1, wherein the magnetic portion is heat treated.

3. An apparatus comprising:

a cylindrical housing defining a plurality of fluid paths through a peripheral wall thereof;

a plunger;

a stator located adjacent to the cylindrical housing, the stator forming a magnetic circuit in combination with the plunger, the stator further defining:

an accommodating portion for supporting the plunger with the accommodating portion so that the plunger is capable of reciprocation; and an attracting portion, wherein a magnetic attractive force attracts the plunger in a reciprocating direction of the plunger and acts between the attracting portion and the plunger;

a coil that generates the magnetic attractive force when energized, wherein either one or both of at least an outer peripheral wall of the plunger and at least an inner peripheral wall of the accommodating portion form(s) a magnetic portion made of nickel phosphide, and the phosphorus content of the magnetic portion is set within a range of greater than 10% a to less than or equal to 15% in mass percentage;

a moving member for reciprocating together with the plunger to control a flow rate of fluid flowing through the fluid paths; and a biasing means for biasing the moving member in a direction opposite to a direction in which the plunger is attracted by the attracting portion.

4. The apparatus according to claim 1, wherein the magnetic portion comprises a nickel phosphide layer disposed on an outer periphery of a body of the plunger.

5. The apparatus according to claim 4, wherein the body of the plunger is made of iron.

6. The apparatus according to claim 4, wherein the nickel phosphide layer has a surface hardness of about HV 900.

7. The apparatus according to claim 4, wherein the nickel phosphide layer is formed by plating and is heat treated.

8. The apparatus according to claim 1, wherein the magnetic portion is limited to the outer peripheral wall of the plunger.

9. The apparatus according to claim 1, wherein a magnetic resistance portion is arranged between the accommodating portion and the attracting portion and is thinner than said accommodating portion and attracting portion to suppress flux leakage between the accommodating portion and the attracting portion.

10. The apparatus according to claim 1, wherein a soft nitrided layer is provided on the inner peripheral wall of the accommodating portion.

11. The apparatus according to claim 10, wherein the soft nitrided layer has a surface hardness of about HV 600.

* * * * *